United States Patent
Boban

(10) Patent No.: US 11,119,546 B2
(45) Date of Patent: Sep. 14, 2021

(54) EXCHANGEABLE POWERED INFRASTRUCTURE MODULE

(71) Applicant: COMMSCOPE, INC. OF NORTH CAROLINA, Hickory, NC (US)

(72) Inventor: Benji Boban, Hickory, NC (US)

(73) Assignee: COMMSCOPE, INC. OF NORTH CAROLINA, Hickory, NC (US)

( * ) Notice: Subject to any disclaimer, the term of this patent is extended or adjusted under 35 U.S.C. 154(b) by 172 days.

(21) Appl. No.: 16/348,772

(22) PCT Filed: Nov. 9, 2017

(86) PCT No.: PCT/US2017/060844
§ 371 (c)(1),
(2) Date: May 9, 2019

(87) PCT Pub. No.: WO2018/089623
PCT Pub. Date: May 17, 2018

(65) Prior Publication Data
US 2019/0361509 A1    Nov. 28, 2019

Related U.S. Application Data

(60) Provisional application No. 62/419,679, filed on Nov. 9, 2016.

(51) Int. Cl.
*G06F 1/00* (2006.01)
*G06F 1/26* (2006.01)
(Continued)

(52) U.S. Cl.
CPC ............... *G06F 1/26* (2013.01); *H04L 12/10* (2013.01); *H04L 49/40* (2013.01); *G06F 1/3203* (2013.01)

(58) Field of Classification Search
CPC ............ G06F 1/26; H04L 12/10; H04L 49/40
(Continued)

(56) References Cited

U.S. PATENT DOCUMENTS

| 4,089,585 A | 5/1978 | Slaughter |
| 4,199,225 A | 4/1980 | Slaughter |

(Continued)

FOREIGN PATENT DOCUMENTS

| CN | 1152784 A | 6/1997 |
| CN | 102428663 A | 4/2012 |

(Continued)

OTHER PUBLICATIONS

International Search Report and Written Opinion of the International Searching Authority for International Patent Application No. PCT/US2017/060844 dated Feb. 6, 2018, 8 pages.
(Continued)

*Primary Examiner* — Volvick Derose
(74) *Attorney, Agent, or Firm* — Merchant & Gould P.C.

(57) ABSTRACT

An apparatus includes a backplane and a removable blade. The backplane is mounted to a housing and is operably coupled to the Ethernet. The removable blade is operably coupled to the backplane and is selectable from and interchangeable with: (a) a removable blade configured to receive an Ethernet input and product an Ethernet output; and (b) a removable blade configured to receive a non-Ethernet input and produce an Ethernet output representative of the non-Ethernet input.

20 Claims, 6 Drawing Sheets

(51) Int. Cl.
  *H04L 12/10* (2006.01)
  *H04L 12/931* (2013.01)
  *G06F 1/3203* (2019.01)

(58) Field of Classification Search
  USPC .......................................................... 713/300
  See application file for complete search history.

(56) References Cited

U.S. PATENT DOCUMENTS

| | | |
|---|---|---|
| 4,220,812 A | 9/1980 | Ney et al. |
| 4,359,598 A | 11/1982 | Dey et al. |
| 4,365,865 A | 12/1982 | Stiles |
| 4,467,138 A | 8/1984 | Brorein |
| 4,497,537 A | 2/1985 | Dench |
| 4,552,432 A | 11/1985 | Anderson et al. |
| 4,695,127 A | 9/1987 | Ohlhaber et al. |
| 4,723,832 A | 2/1988 | Okazato et al. |
| 4,729,628 A | 3/1988 | Kraft et al. |
| 4,761,053 A | 8/1988 | Cogelia et al. |
| 4,787,705 A | 11/1988 | Shinmoto et al. |
| 4,867,527 A | 9/1989 | Dotti et al. |
| 4,895,426 A | 1/1990 | Pinson |
| 5,268,971 A | 12/1993 | Nilsson et al. |
| 5,448,670 A | 9/1995 | Blew et al. |
| 5,469,523 A | 11/1995 | Blew et al. |
| 5,494,461 A | 2/1996 | Bippus et al. |
| 5,530,842 A * | 6/1996 | Abraham ............... H04L 12/46 370/434 |
| 5,539,851 A | 7/1996 | Taylor et al. |
| 5,555,336 A | 9/1996 | Winslow |
| 5,555,338 A | 9/1996 | Haag et al. |
| 5,557,698 A | 9/1996 | Gareis et al. |
| 5,651,081 A | 7/1997 | Blew et al. |
| 5,677,974 A | 10/1997 | Elms et al. |
| 5,737,470 A | 4/1998 | Nagano et al. |
| 5,745,627 A | 4/1998 | Arroyo et al. |
| 5,778,116 A | 7/1998 | Tomich |
| 5,838,858 A | 11/1998 | White |
| 5,896,480 A | 4/1999 | Scharf et al. |
| 5,913,003 A | 6/1999 | Arroyo et al. |
| 5,982,966 A | 11/1999 | Bonicel |
| 6,142,802 A | 11/2000 | Berg et al. |
| 6,157,534 A * | 12/2000 | Gallagher ............... G06F 1/189 312/223.2 |
| 6,169,834 B1 | 1/2001 | Keller |
| 6,195,487 B1 | 2/2001 | Anderson et al. |
| 6,236,789 B1 | 5/2001 | Fitz |
| 6,343,172 B1 | 1/2002 | Schiestle |
| 6,347,172 B1 | 2/2002 | Keller et al. |
| 6,363,192 B1 | 3/2002 | Spooner |
| 6,370,303 B1 | 4/2002 | Fitz et al. |
| 6,463,198 B1 | 10/2002 | Coleman |
| 6,493,491 B1 | 12/2002 | Shen et al. |
| 6,542,674 B1 | 4/2003 | Gimblet |
| 6,567,592 B1 | 5/2003 | Gimblet et al. |
| 6,599,025 B1 | 7/2003 | Deutsch |
| 6,621,964 B2 | 9/2003 | Quinn et al. |
| 6,687,437 B1 | 2/2004 | Starnes et al. |
| 6,719,461 B2 | 4/2004 | Cull |
| 6,738,547 B2 | 5/2004 | Spooner |
| 6,755,575 B2 | 6/2004 | Kronlund et al. |
| 6,758,693 B2 | 7/2004 | Inagaki et al. |
| 6,836,603 B1 | 12/2004 | Bocanegra et al. |
| 6,847,767 B2 | 1/2005 | Hurley et al. |
| 6,931,183 B2 | 8/2005 | Panak et al. |
| 6,965,718 B2 | 11/2005 | Koertel |
| 7,006,740 B1 | 2/2006 | Parris |
| 7,158,703 B2 | 1/2007 | Mjelstad |
| 7,181,173 B1 | 2/2007 | Daly et al. |
| 7,218,821 B2 | 5/2007 | Bocanegra et al. |
| 7,225,534 B2 | 6/2007 | Kachmar |
| 7,272,281 B2 | 9/2007 | Stahulak et al. |
| 7,310,430 B1 | 12/2007 | Mallya et al. |
| 7,362,936 B2 | 4/2008 | Stark et al. |
| 7,371,014 B2 | 5/2008 | Willis et al. |
| 7,387,517 B2 | 6/2008 | Kusada et al. |
| 7,401,985 B2 | 7/2008 | Aronson et al. |
| 7,445,389 B2 | 11/2008 | Aronson |
| 7,494,287 B2 | 2/2009 | Wang et al. |
| 7,499,616 B2 | 3/2009 | Aronson et al. |
| 7,643,631 B2 | 1/2010 | Kennedy |
| 7,643,713 B2 | 1/2010 | Buthe et al. |
| 7,692,098 B2 | 4/2010 | Wayatt, II et al. |
| 7,712,976 B2 | 5/2010 | Aronson et al. |
| 7,744,288 B2 | 6/2010 | Lu et al. |
| 7,746,883 B2 | 6/2010 | Erickson et al. |
| 7,762,727 B2 | 7/2010 | Aronson |
| 7,778,510 B2 | 8/2010 | Aronson et al. |
| 7,876,989 B2 | 1/2011 | Aronson et al. |
| 7,897,873 B2 | 3/2011 | Gemme et al. |
| 7,918,609 B2 | 4/2011 | Melton et al. |
| 8,041,166 B2 | 10/2011 | Kachmar |
| 8,059,929 B2 | 11/2011 | Cody et al. |
| 8,083,417 B2 | 12/2011 | Aronson et al. |
| 8,155,525 B2 | 4/2012 | Cox |
| 8,175,433 B2 | 5/2012 | Caldwell et al. |
| 8,184,935 B2 | 5/2012 | Kachmar |
| 8,204,348 B2 | 6/2012 | Keller et al. |
| 8,238,706 B2 | 8/2012 | Kachmar |
| 8,244,087 B2 | 8/2012 | Sales Casals et al. |
| 8,249,410 B2 | 8/2012 | Andrus et al. |
| 8,270,838 B2 | 9/2012 | Cox |
| 8,290,320 B2 | 10/2012 | Kachmar |
| 8,297,854 B2 | 10/2012 | Bickham et al. |
| 8,301,003 B2 | 10/2012 | de Los Santos Campos et al. |
| 8,328,433 B2 | 12/2012 | Furuyama |
| 8,363,994 B2 | 1/2013 | Kachmar |
| 8,480,312 B2 | 7/2013 | Smith et al. |
| 9,893,811 B2 | 2/2018 | Chappell et al. |
| 2002/0126967 A1 | 9/2002 | Panak et al. |
| 2002/0136510 A1 | 9/2002 | Heinz et al. |
| 2002/0147978 A1 | 10/2002 | Dolgonos et al. |
| 2003/0023741 A1 * | 1/2003 | Tomassetti ....... H04N 21/43615 709/231 |
| 2003/0108351 A1 | 6/2003 | Feinberg et al. |
| 2003/0202756 A1 | 10/2003 | Hurley et al. |
| 2003/0215197 A1 | 11/2003 | Simon et al. |
| 2003/0228799 A1 | 12/2003 | Machado et al. |
| 2004/0258165 A1 | 12/2004 | Peltonen |
| 2005/0002622 A1 | 1/2005 | Sutehall et al. |
| 2005/0120141 A1 | 6/2005 | Zur et al. |
| 2005/0185903 A1 | 8/2005 | Koertel |
| 2006/0153516 A1 | 7/2006 | Napiorkowski et al. |
| 2006/0165355 A1 | 7/2006 | Greenwood et al. |
| 2006/0203460 A1 * | 9/2006 | Aviv ................... H05K 7/1492 361/788 |
| 2007/0248358 A1 | 10/2007 | Sauer |
| 2007/0269170 A1 | 11/2007 | Easton et al. |
| 2007/0274322 A1 * | 11/2007 | Hansalia ................. H04L 12/66 370/395.53 |
| 2008/0037941 A1 | 2/2008 | Mallya |
| 2008/0044141 A1 * | 2/2008 | Willis .................. G02B 6/3887 385/88 |
| 2008/0131132 A1 | 6/2008 | Solheid et al. |
| 2008/0212276 A1 * | 9/2008 | Bottom ................. H04L 49/351 361/679.33 |
| 2008/0219621 A1 | 9/2008 | Aldeghi et al. |
| 2008/0260389 A1 | 10/2008 | Zheng |
| 2009/0041413 A1 | 2/2009 | Hurley |
| 2009/0297104 A1 | 12/2009 | Kachmar |
| 2010/0150556 A1 | 6/2010 | Soto et al. |
| 2010/0178054 A1 | 7/2010 | Cain |
| 2010/0200270 A1 | 8/2010 | Gemme et al. |
| 2010/0209058 A1 | 8/2010 | Ott |
| 2010/0290787 A1 | 11/2010 | Cox |
| 2010/0321591 A1 | 12/2010 | Onomatsu |
| 2011/0009016 A1 | 1/2011 | Liu et al. |
| 2011/0021069 A1 | 1/2011 | Hu et al. |
| 2011/0038582 A1 | 2/2011 | DiFonzo et al. |
| 2011/0091174 A1 | 4/2011 | Kachmar |
| 2011/0163605 A1 | 7/2011 | Ronen et al. |
| 2011/0188815 A1 | 8/2011 | Blackwell, Jr. et al. |
| 2011/0268446 A1 | 11/2011 | Cune et al. |

(56) References Cited

U.S. PATENT DOCUMENTS

| | | |
|---|---|---|
| 2011/0268452 A1 | 11/2011 | Beamon et al. |
| 2011/0280527 A1 | 11/2011 | Tamura |
| 2011/0293227 A1 | 12/2011 | Wu |
| 2011/0311191 A1 | 12/2011 | Hayashishita et al. |
| 2012/0008904 A1 | 1/2012 | Han et al. |
| 2012/0008905 A1 | 1/2012 | Han et al. |
| 2012/0008906 A1 | 1/2012 | Han et al. |
| 2012/0023343 A1* | 1/2012 | Gupta ............... H04L 12/40039 713/310 |
| 2012/0057821 A1 | 3/2012 | Aronson et al. |
| 2012/0080225 A1 | 4/2012 | Kim et al. |
| 2012/0114288 A1 | 5/2012 | Wu |
| 2012/0191997 A1 | 7/2012 | Miller |
| 2012/0230637 A1 | 9/2012 | Kachmar |
| 2012/0281952 A1 | 11/2012 | McColloch |
| 2012/0281953 A1 | 11/2012 | Choi et al. |
| 2012/0288245 A1 | 11/2012 | Hurley et al. |
| 2012/0295486 A1 | 11/2012 | Petersen et al. |
| 2013/0011106 A1 | 1/2013 | Congdon, II et al. |
| 2013/0022318 A1 | 1/2013 | Fingler et al. |
| 2013/0111234 A1 | 5/2013 | Gupta |
| 2013/0187457 A1 | 7/2013 | Schlichter et al. |
| 2013/0287349 A1 | 10/2013 | Faulkner et al. |
| 2013/0330086 A1 | 12/2013 | Berlin et al. |
| 2014/0072264 A1* | 3/2014 | Schroder ............... H04J 14/00 385/76 |
| 2014/0086099 A1* | 3/2014 | Li .......................... H04L 41/12 370/254 |
| 2014/0087742 A1* | 3/2014 | Brower ............... H04B 10/808 455/450 |
| 2014/0258738 A1* | 9/2014 | Greenwait ............ G06F 1/3278 713/300 |
| 2014/0258742 A1 | 9/2014 | Chien et al. |
| 2014/0293994 A1* | 10/2014 | Pepe ................ H04L 12/40045 370/352 |
| 2014/0314412 A1 | 10/2014 | Soto et al. |
| 2014/0338968 A1 | 11/2014 | Kachmar et al. |
| 2015/0078376 A1* | 3/2015 | Wisehart ............... H04L 47/52 370/389 |
| 2015/0125146 A1 | 5/2015 | Erreygers et al. |
| 2015/0215131 A1 | 7/2015 | Paul et al. |
| 2015/0309271 A1 | 10/2015 | Kluegerich et al. |
| 2016/0020911 A1 | 1/2016 | Sipes et al. |
| 2016/0056597 A1 | 2/2016 | Larsen et al. |
| 2016/0164229 A1 | 6/2016 | Boban |
| 2016/0183351 A1* | 6/2016 | Snyder ............... H04L 12/2818 315/152 |

FOREIGN PATENT DOCUMENTS

| | | |
|---|---|---|
| CN | 102934377 A | 2/2013 |
| EP | 0 629 889 A1 | 12/1994 |
| EP | 1 650 888 A1 | 4/2006 |
| EP | 2 393 220 A1 | 7/2011 |
| EP | 2 393 222 A1 | 12/2011 |
| EP | 2 676 161 A2 | 12/2013 |
| JP | 2015-222721 A | 12/2015 |
| KR | 10-1997-0060748 A | 8/1997 |
| KR | 20-0273482 Y1 | 4/2002 |
| KR | 10-2006-0016012 A | 2/2006 |
| WO | 2010/102201 A2 | 9/2010 |
| WO | 2011/146720 A2 | 11/2011 |
| WO | WO2012/112532 A2 | 8/2012 |
| WO | 2013/117598 A2 | 8/2013 |
| WO | 2014/197103 A2 | 12/2014 |
| WO | 2018/049314 A1 | 3/2018 |

OTHER PUBLICATIONS

Anybus by HMS Networks, Technologies EtherNet/IP, 18 pages, (2016), https://www.anybus.com/technologies/industrial-ethernet/ethernet-ip.

"GE—Critical Power, DAS and Small Cell Powering Architectures," DAS and Small Cell Congress, May 1, 2013; 22 pages.

OneReach PoE Extender System brochure from Berk-Tek, 8 pages (Jan. 2011).

Silvertel, "Ag5700 200W Powered Device Module" datasheet, dated Aug. 2012. Retrieved from http://www.silvertel.com/images/datasheets/AG5700-datasheet-200W-Power-over-Ethernet-PoE-PD.pdf; 14 pages.

Littelfuse Inc., "Transient Suppression Devices and Principles" application note AN9768, dated Jan. 1998. Retrieved from http://littelfuse.com/-/media/electronics_technical/application_notes/varistors/littelfuse_transient_suppression_devices_and_principles_application_note.pdf; 8 pages.

"Draft Standard for Ethernet Amendment 4: Physical Layer Specifications and Management Parameters for 1 Gb/s Operation over a Single Twisted Pair Copper Cable", IEEE P802.3bpTM/D3.4, 220 pgs. (2016).

Model NV-EC1701U Eo2TM, Ethernet over 2-Wire Transceiver with PoE+ or High Power PoE: Complete Installation Guide, NVT, Inc., 1-12 (2014).

Extended European Search Report for corresponding European Patent Application No. 17869262.0 dated Apr. 23, 2020, 9 pages.

* cited by examiner

EXCHANGEABLE POWERED INFRASTRUCTURE MODULE

CROSS-REFERENCE TO RELATED APPLICATION

This application is a National Stage Patent Application of PCT/US2017/060844, filed on Nov. 9, 2017, which claims the benefit of U.S. Patent Application Ser. No. 62/419,679, filed on Nov. 9, 2016, the disclosures of which are incorporated herein by reference in their entireties. To the extent appropriate, a claim of priority is made to each of the above disclosed applications.

TECHNICAL FIELD

The present disclosure is directed to network systems and, more particularly, to exchangeable powered infrastructure modules that provide consolidated support to Ethernet and non-Ethernet infrastructure.

BACKGROUND

Over the past 10 years, many new applications have come to utilize information technology (IT) infrastructure, specifically, Ethernet cabling, as the physical layer medium for information transport. Ethernet systems have become commonplace in office buildings, manufacturing facilities and even homes. However, many technologies still exist or are being newly developed that require infrastructure cabling support beyond that which can be supplied by standard Ethernet networks, such as AC power cabling and audio/video cabling. Notably, each different type of infrastructure cabling brings with it the cost and complexity of incorporating that infrastructure cabling into new or existing network layouts.

SUMMARY

The present disclosure is directed to various devices, systems and methods for network consolidation points that can support both Ethernet and non-Ethernet infrastructure.

One aspect of the present disclosure is directed to an apparatus that includes a backplane and a removable blade. The backplane is mounted to a housing and is operably coupled to the Ethernet. The removable blade is operably coupled to the backplane and is selectable from and interchangeable with: (a) a removable blade configured to receive an Ethernet input and product an Ethernet output; and (b) a removable blade configured to receive a non-Ethernet input and produce an Ethernet output representative of the non-Ethernet input.

Another aspect of the disclosure is directed to a plurality of apparatuses that are operably coupled to an Ethernet local area network (LAN). Each apparatus supports a single-user multi-purpose area network that has both Ethernet and non-Ethernet infrastructure. Each apparatus includes a backplane and a removable blade. The backplane is mounted to a housing and is operably coupled to the Ethernet. The removable blade is operably coupled to the backplane and is selectable from and interchangeable with: (a) a removable blade configured to receive an Ethernet input and product an Ethernet output; and (b) a removable blade configured to receive a non-Ethernet input and produce an Ethernet output representative of the non-Ethernet input.

Still another aspect of the disclosure is directed to a method for establishing a multi-purpose area network consolidation point. The method includes: (a) installing a housing-mounted backplane within a pre-defined single-user multi-purpose area having both Ethernet and non-Ethernet infrastructure; (b) operably coupling the backplane to an Ethernet local area network (LAN); (c) operably coupling a first removable blade to the backplane, the first removable blade configured to receive an Ethernet input from the LAN or from an Ethernet infrastructure device, the first removable blade additionally configured to produce an Ethernet output to the LAN or the Ethernet infrastructure device; (d) operably coupling a second removable blade to the backplane, the second removable blade configured to receive a non-Ethernet input from a non-Ethernet infrastructure device and produce an Ethernet output representative of the non-Ethernet input to the LAN, the second removable blade additionally configured to receive an Ethernet input from the LAN and produce a non-Ethernet output representative of the Ethernet input to the non-Ethernet infrastructure device.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Reference will now be made in detail to exemplary implementations of the present invention, examples of which are illustrated in the accompanying drawings. While exemplary implementations are provided, other implementations are possible in light of the specification. As such, changes may be made to the exemplary implementations described herein without departing from the spirit and scope of the invention. The following detailed description does not limit the invention; but instead, the scope of the invention is defined by the appended claims and their equivalents. Wherever possible, the same reference numbers may be used throughout the drawings to refer to the same or like parts.

The present disclosure is directed to exchangeable powered infrastructure modules and systems that provide consolidated support to Ethernet and non-Ethernet infrastructure.

Figure 1:
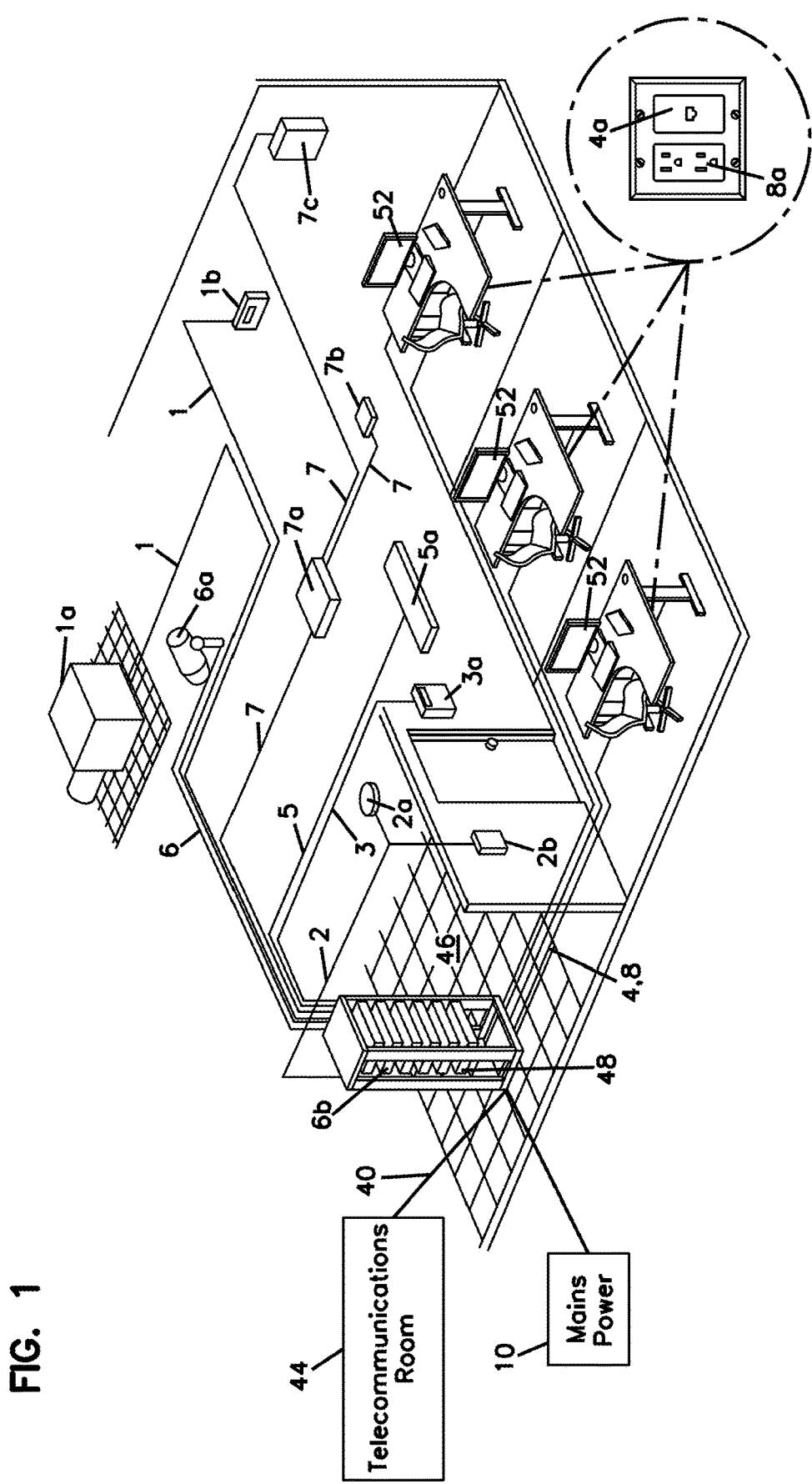
FIG. 1 is an exemplary schematic of the various network and system cablings involved in typical office building.

Within a commercial building, the wiring/cabling of an office with numerous system requirements presents a complex situation. Referring to FIG. 1, numerous cabling runs are provided to support the various types of systems needed for day-to-day operation of the building including, for example, HVAC systems (illustrated with cabling runs 1, HVAC unit 1a and thermostat 1b), fire alarm system (illustrated with cabling run 2, smoke detector 2a, and alarm panel 2b), access control systems (illustrated with cabling run 3 and access panel 3a), Ethernet systems (illustrated with cabling runs 4 and outlet 4a), lighting (illustrated with cabling run 5 and light fixture 5a), security cameras (illustrated with cabling run 6, camera 6a and power receiver 6b), wireless systems (illustrated with cabling runs 7, consolidation point 7a, and access points 7b, 7c), and basic electrical (illustrated with cabling runs 8 and outlet 8a).

Figure 2:
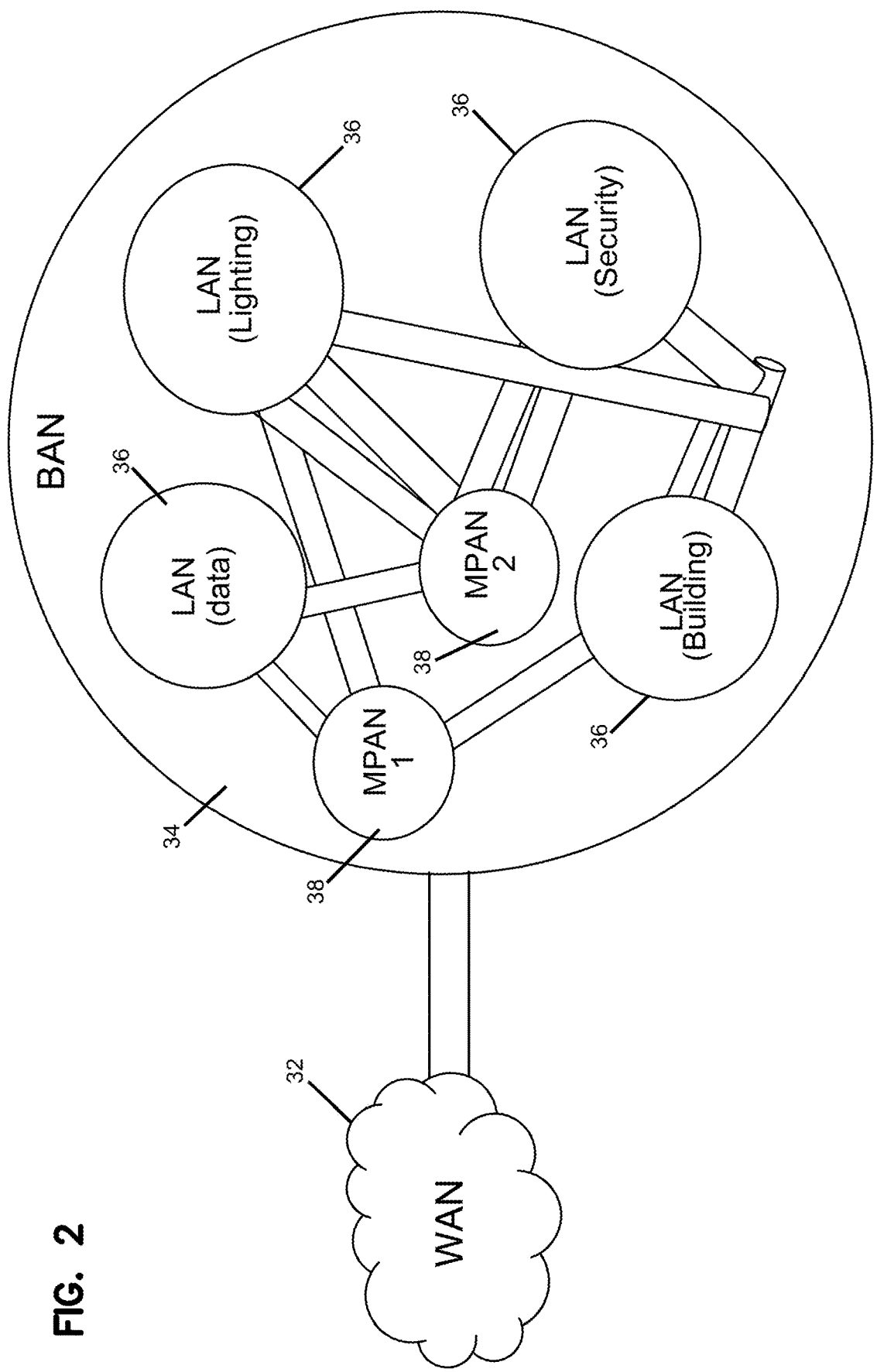
FIG. 2 is an exemplary schematic of the various area networks of an office building.

Of immediate interest are the distinct cabling runs required for: (a) the distribution of power; (b) security/camera networks; and (c) Ethernet networks. Power distribution is achieved through a mains connection 10 that is broken down into various branch circuits to supply all systems requiring AC power via numerous wiring runs, e.g., 1, 2, 3, 4, 5, and 8. Security cameras 6a are coupled via a separate cabling network back to a power receiver 6b with each camera 6a requiring its own cabling run 6. Ethernet network cabling 4 is provided to address the various network needs, see FIG. 2, including wide area networks (WAN) 32, building area networks (BAN) 34, local area networks (LAN) 36 and multi-purpose area networks (MPAN) 38. As illustrated in FIG. 2 the WAN 32 connects the BAN 34 to the outside world while the BAN 34 contains multiple local area networks (LAN) 36 as well as a plurality of multi-purpose area networks (MPAN) 38 which comprise the single-user, personal networks having both Ethernet and non-Ethernet infrastructure within a single-user, personal workspace area.

Referring again to FIG. 1, the Ethernet networks rely on an infrastructure that generally consists of two basic segments: the backbone (or riser) 40 and the horizontal 42. The backbone 40 connects the telecommunications rooms 44 to a centrally located equipment room 46 while the horizontal 42 section of the network includes both the connection between a patch panel 48 in the equipment room 46 (or the telecommunications room) and a telecommunications outlet 4a in the work area, and the connection between the telecommunications outlet 4a and an end device 52.

Figure 3:
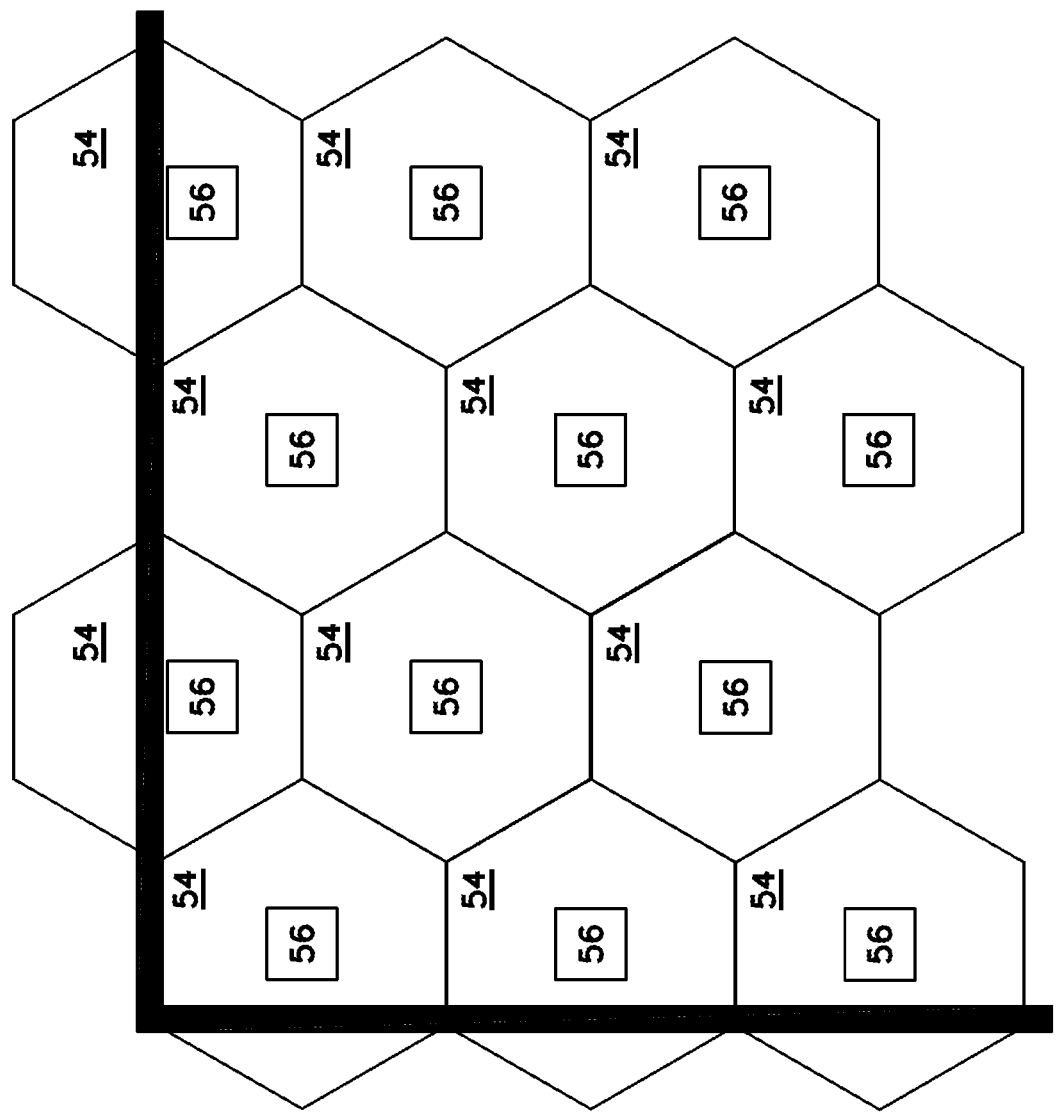
FIG. 3 is a schematic illustrating an exemplary zone or cell network layout.

Various distribution strategies can be used for establishing the desired networks including networks with or without intermediate distribution points. In one example configuration, a horizontal distribution strategy known as zone cabling utilizes cable runs from the telecommunication room to specific building zones, which can comprise specific service areas or evenly sized service areas known as cells 54, e.g., see FIG. 3. A consolidation point 56 within each zone establishes a permanent intermediate connection with fixed cabling installed between the telecommunications room 44 (see FIG. 1) and the consolidation point 56.

Figure 4:
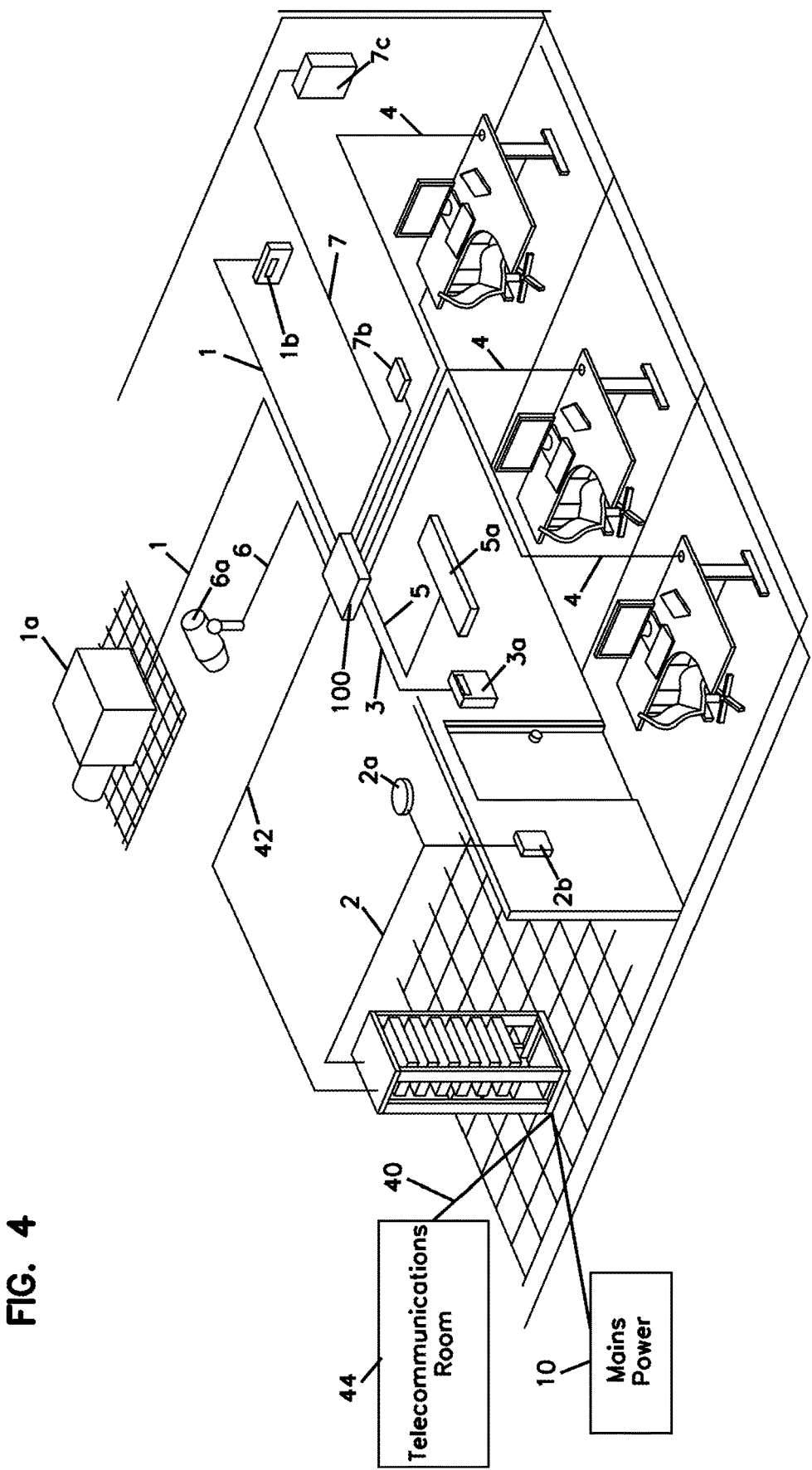
FIG. 4 is schematic of a single-user multi-purpose area network equipped with an exchangeable powered infrastructure module of the present disclosure.

The present disclosure provides for a consolidation point in the form of an exchangeable powered infrastructure module (EPIM) 100 with a single PoE network input 42, see FIG. 4, that can help to reduce the number of non-Ethernet wiring/cable runs (e.g., HVAC 1, access control 3, lighting 5, security/camera 6, wireless 7) and can serve as an organizer for the multi-purpose area network (MPAN 38, see FIG. 2) providing support for Ethernet (e.g., standard Ethernet or PoE) and non-Ethernet infrastructure. In utilizing the EPIM 100, an Ethernet drop is no longer limited solely to Ethernet applications but is open to support non-Ethernet utilities (e.g., non-Base-T utilities such as lighting, sensor networks, security systems, etc.) and non-Ethernet devices with the ability to utilize a cloud based setup to process management and traffic data from all EPIMs 100 within a building. A non-Ethernet utility comprises any utility whose devices are not configured for direct connection to the Ethernet, for example, a non-Base-T utility such as lighting networks, sensor networks, security systems, etc. while non-Ethernet devices are those devices not configured for direct connection to the Ethernet, e.g., lights, video cameras, sensors, etc. but rather require some type of input or output conversion to be operable with the Ethernet.

A plurality of EPIMs 100 establishes a daisy-chainable mesh network where the signal format conversions for non-Ethernet devices are performed by individual blades within the EPIM 100 rather than at the device itself. As such, the applications supported by the EPIM 100 can vary based on the types of blades selected to operate within the EPIM 100 and can be easily changed by swapping out a blade having a first functionality with a blade having a second functionality. In various example embodiments, the blades are hot swappable, e.g., swappable while the backplane remains in operation.

Figure 5:
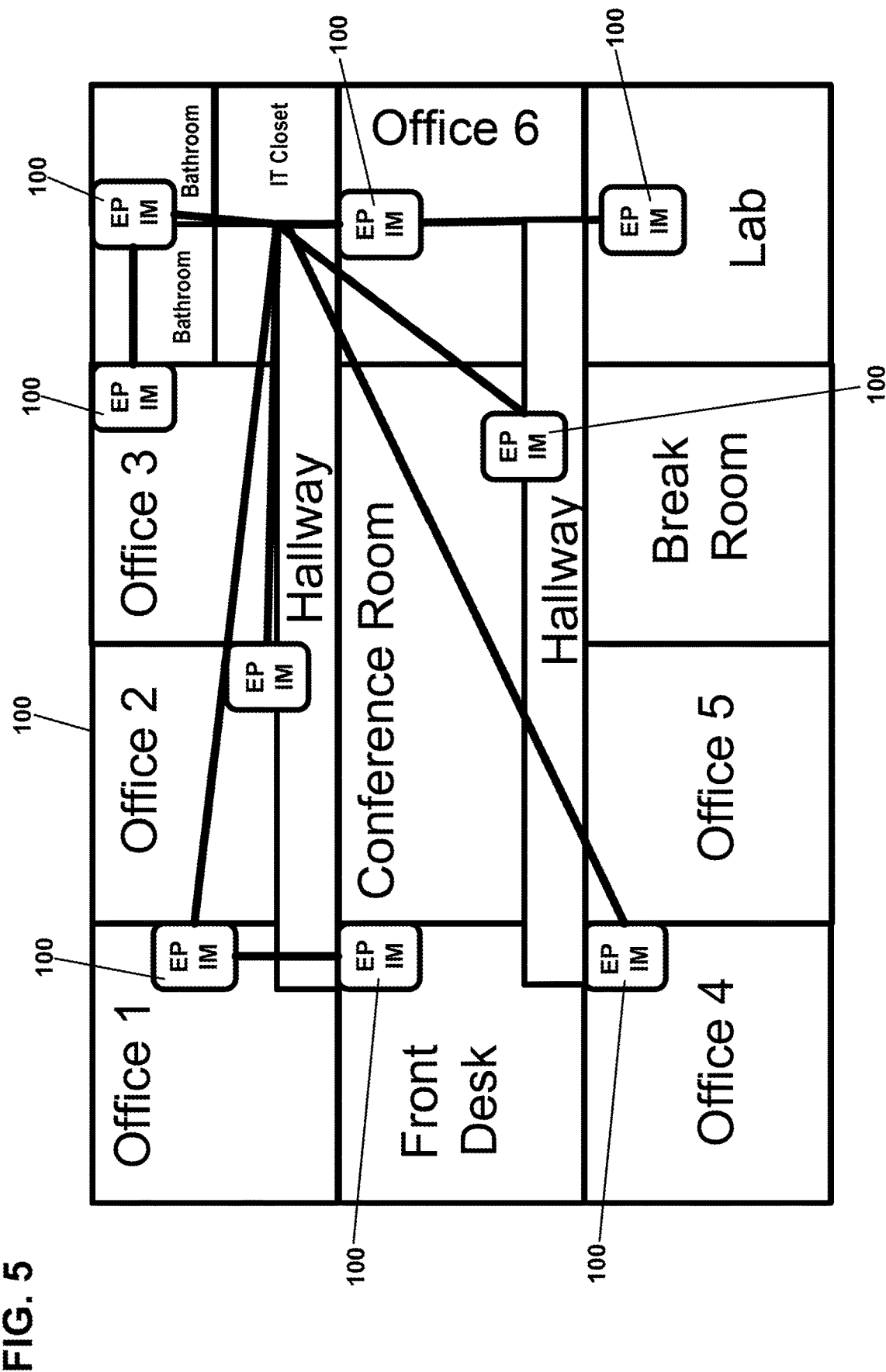
FIG. 5 is schematic of a plurality of multi-purpose areas where each area is provided with the exchangeable powered infrastructure module of the present disclosure.

FIG. 5 provides one example of EPIM 100 usage within the zone architecture of a floor 101 of a commercial building. In this configuration each EPIM 100 provides a multi-purpose space with access to the LAN 36 or BAN 34 (see FIG. 2). Further, each EPIM 100 can serve as a relay, or repeater, from one EPIM to another to simplify cabling and can be installed in a floor, ceiling, or wall location as appropriate.

Figure 6:
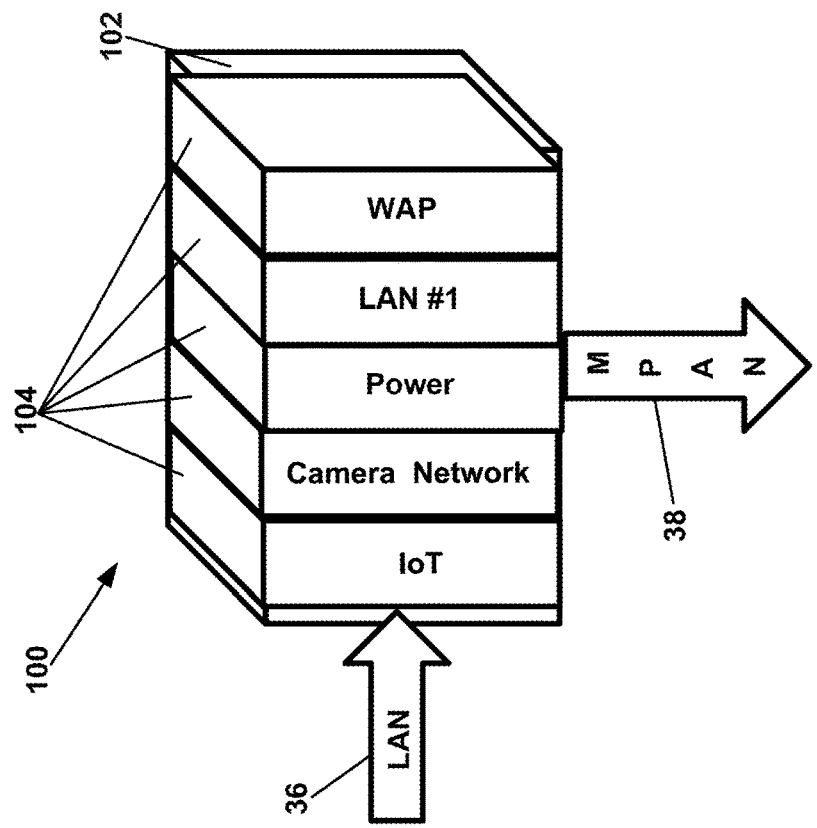
FIG. 6 is a schematic of an exemplary configuration of the exchangeable powered infrastructure module of the present disclosure.
Figure 6:
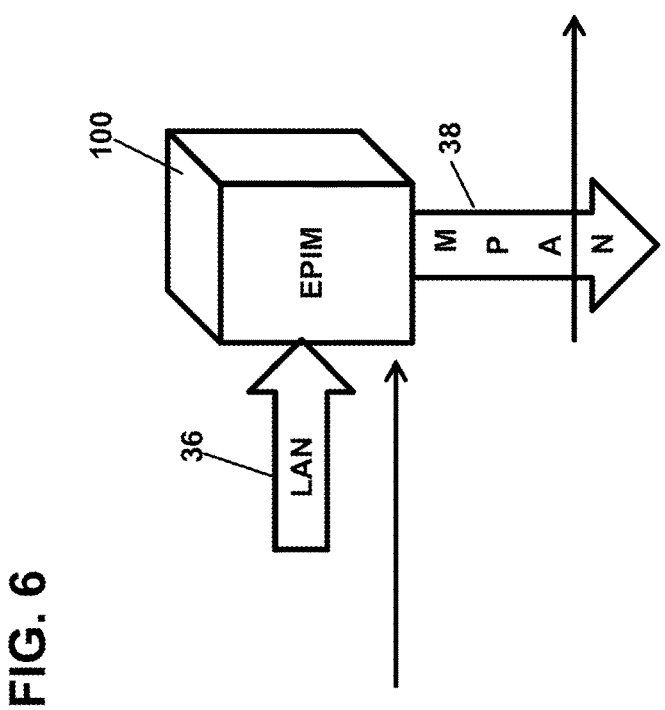

In the illustrated example of FIG. 6, the EPIM 100 is in a box configuration (other physical configurations may be used as appropriate) that includes a backplane 102 configured to receive one or more blades 104. The input to the EPIM 100 itself is the LAN 106 with power to the EPIM 100 provided by the LAN utilizing power over Ethernet (e.g., PoE, PoE+, PoE++) technology and/or AC power.

The blades 104 operable within the backplane 102 of the EPIM 100 are selectable from among a plurality of blades configured to provide support to Ethernet and non-Ethernet infrastructure within the MPAN. The blades 104 can generally be categorized as supporting three types of applications. These types of applications include: (1) utility management; (2) utility enhancement; and (3) infrastructure addition.

Blades 104 suitable for utility management include those blades that are connectable to utilities that are not currently connected to the Ethernet with the ability to then utilize Ethernet connectivity to manage the utility. In one example embodiment, the utility management blade comprises an engine blade that is configured for connection to one or more lighting technologies such as LED, fluorescent, CFL and HID lighting and their related components such as controllers, sensors and wall switches. In this embodiment, the engine blade is configured to centralize power conversion, control processing and communications for the lighting technologies. In another example embodiment, the utility management blade comprises a security network blade that is configured to connect to a non-Ethernet based security network that can, for example, include one or more cameras and/or one or more sensors in a MPAN 38 or LAN 36. In this embodiment, the security network blade is configured to control the utility, e.g., the cameras and sensors, as well as obtain information from any feedback generated by the utility. In still another example embodiment, the utility management blade comprises an optical network terminal (ONT) blade for a passive optical network (PON). Other utility management blades providing different functionalities may also be used with the EPIM 100.

Blades 104 suitable for utility enhancement include those that provide supplemental Ethernet support to existing Ethernet based infrastructure. In various example embodiments, a blade for utility enhancement can comprise: (a) a PoE injector blade to inject PoE onto an existing non-PoE cable; (b) a breakout blade to breakout, for example, 10G Ethernet to 1G, 2.5G or 5 Gbps Ethernet; (c) a hub blade to connect multiple Ethernet devices together; (d) an imVision® controller blade for infrastructure management; and/or (e) an internet of things (IoT) gateway blade to connect infrastructure device and secure data flow between devices and the cloud, as well as aggregate, share and filter data for analysis. In many instances, but not exclusively, utility enhancement blades comprise blades that have a pass-through configuration taking in one cable and passing out another cable. Other utility enhancement blades providing different functionalities, e.g., switching, repeating, etc., may also be used with the EPIM 100.

Blades 104 suitable for infrastructure addition include those blades configured to operate with utilities that are not currently connected to the Ethernet but can be converted to Ethernet and require active circuitry. In various example embodiments, a blade for infrastructure addition can comprise: (a) an audio blade configured to support packet based transport such as Dante; (b) a video blade to convert an HDBaseT video signal to an Ethernet signal; (c) a wireless application protocol (WAP) blade for wireless communication of data; and/or (d) a digital electricity blade for delivering DC power and establishing a DC power grid. In some example embodiments, the infrastructure addition blades include active conversion circuitry as well as provide management and any power necessary to endpoints over Ethernet cabling. In some example embodiments, the infrastructure addition blades are configured to send converted data into a building LAN for interconnection with other equipment, or to control and monitor. Other infrastructure addition blades providing different functionalities e.g., optical computing, etc., may also be used with the EPIM 100.

The use of one or more EPIMs 100 within a system provides an end user with the benefit of multiple applications instead of being limited to Ethernet only applications. For example, an EPIM 100 equipped with a PoE injector blade enables an end user to use an Ethernet port to power a phone tablet, or laptop while an EPIM 100 equipped with video blade for conversion to HDBaseT provides the end user with a port for video traffic; the configuration of the EPIM 100 can change easily with the swapping of blades. Benefits to the building owner or contractor include the reduction or elimination of other types of infrastructure cabling, e.g. a reduction in the number of power outlets or reduction in video cabling, as well as a reduction or elimination of costs associated with other types of infrastructure cabling. Benefits to an IT manager using EPIMs include the ability to change network infrastructure without rewiring, e.g. PoE can be added to an Ethernet port through use of an appropriate blade, a breakout blade can be used to reduce 10 Gbps to 1 Gbps for an end device, or temporarily adding a video port to a room can be quickly and easily achieved by inserting a video blade into an EPIM 100. An IT manager also has the benefit of higher visibility into the physical layer through the EPIM's constant monitoring and data aggregation of its various ports.

While the example of FIG. 5, described above, is directed to a zone cabling architecture, it should be noted that the EPIM 100 is configured with the ability to support divergent cabling architectures in a building including architectures with a traditional cabling layout utilizing main distribution frames (MDF)/intermediate distributions frames (IDF), architectures using zone cabling, and architectures using passive optical network (PON)-type cabling, e.g. point to multi-point. For example, in the instance of the traditional architecture, the EPIM 100 can be configured with a traditional server platform for blade aggregation and multiple blade functionalities. In the instance of zone architecture, the EPIM 100 can comprise a housing configured to house a desired number of blades 104 with the ability to fit in a wall, above a ceiling or in a floor. In the instance of PON type architectures, the EPIM 100 can be configured with a single blade and minimal housing for operation within, for example, a desktop computer.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. An apparatus comprising:
a backplane mounted to a housing within a defined single-user multi-purpose area, the area having both Ethernet infrastructure and non-Ethernet infrastructure, the backplane operably coupled to an Ethernet local area network (LAN) with the LAN supplying power to the backplane by Power over Ethernet (POE);
a first removable blade operably coupled to the backplane, the first removable configured to receive an Ethernet input from the LAN or from an Ethernet infrastructure device, the first removable blade additionally configured to produce an Ethernet output to the LAN or to the Ethernet infrastructure device; and
a second removable blade operably coupled to the backplane, the second removable blade configured to receive a non-Ethernet input from a non-Ethernet infrastructure device and produce an Ethernet output representative of the non-Ethernet input to the LAN, the second removable blade additionally configured to receive an Ethernet input from the LAN and produce a non-Ethernet output representative of the Ethernet input to the non-Ethernet infrastructure device.

2. The apparatus of claim 1, wherein the removable blade is additionally selectable from and interchangeable with: (c) a removable blade configured to deliver power over the Ethernet.

3. The apparatus of claim 1, wherein the removable blade configured to receive an Ethernet input and produce an Ethernet output performs the function of a hub, a repeater, a switch, a power over Ethernet injector, or a gateway to the Internet of Things.

4. The apparatus of claim 1, wherein the non-Ethernet input comprises: a fiber optic input, a non-Ethernet audio input, a non-Ethernet video input, a wireless input or a digital electricity input.

5. The apparatus of claim 1, wherein the removable blade includes a controller to control devices external to the apparatus.

6. The apparatus of claim 1, wherein the removable blade comprises a plurality of removable blades.

7. The apparatus of claim 1, wherein the apparatus supports only a single-user multi-purpose area network.

8. A system comprising:
a plurality of apparatuses operably coupled to an Ethernet local area network (LAN) that includes Power over Ethernet (POE) functionality, wherein each of the plurality of apparatuses supports a single-user multi-purpose area network having both Ethernet and non-Ethernet infrastructure, and wherein each of the plurality of apparatuses comprises:
a backplane mounted to a housing, the backplane operably coupled to the Ethernet LAN, wherein power is supplied to the backplane by the LAN utilizing POE; and
a plurality of removable blades operably coupled to the backplane, the plurality of removable blades including:
a first removable blade operably coupled to the backplane, the first removable configured to receive an Ethernet input from the LAN or from an Ethernet infrastructure device, the first removable blade additionally configured to produce an Ethernet output to the LAN or to the Ethernet infrastructure device; and
a second removable blade operably coupled to the backplane, the second removable blade configured to receive a non-Ethernet input from a non-Ethernet infrastructure device and produce an Ethernet output representative of the non-Ethernet input to the LAN, the second removable blade additionally configured to receive an Ethernet input from the LAN and produce a non-Ethernet output representative of the Ethernet input to the non-Ethernet infrastructure device.

9. The system of claim 8, wherein each of the plurality of removable blades is additionally selectable from and interchangeable with: (c) a removable blade configured to deliver power over the Ethernet.

10. The system of claim 8, wherein the removable blade configured to receive an Ethernet input and produce an Ethernet output performs the function of a hub, a repeater, a switch, a power over Ethernet injector, or a gateway to the Internet of Things.

11. The system of claim 8, wherein the non-Ethernet input comprises: a fiber optic input, a non-Ethernet audio input, a non-Ethernet video input, a wireless input or a digital electricity input.

12. The system of claim 8, wherein at least one of the plurality of removable blades includes a controller to control devices external to the respective apparatus.

13. The system of claim 8, wherein each of the plurality of apparatuses comprises a ceiling-mountable apparatus, a wall-mountable apparatus, and/or a floor-mountable apparatus.

14. The system of claim 8, wherein the plurality of apparatuses are distributed in a zone layout.

15. The system of claim 8, wherein the plurality of removable blades are hot swappable.

16. A method for establishing a multi-purpose area network consolidation point comprising:
installing a backplane, mounted in a housing, within a defined, single-user multi-purpose area, the area having both Ethernet infrastructure and non-Ethernet infrastructure;
operably coupling the backplane to an Ethernet local area network (LAN) with the LAN supplying power to the backplane by Power over Ethernet (POE);
operably coupling a first removable blade to the backplane, the first removable blade configured to receive an Ethernet input from the LAN or from an Ethernet infrastructure device, the first removable blade additionally configured to produce an Ethernet output to the LAN or the Ethernet infrastructure device;
operably coupling a second removable blade to the backplane, the second removable blade configured to receive a non-Ethernet input from a non-Ethernet infrastructure device and produce an Ethernet output representative of the non-Ethernet input to the LAN, the second removable blade additionally configured to receive an Ethernet input from the LAN and produce a non-Ethernet output representative of the Ethernet input to the non-Ethernet infrastructure device.

17. The method of claim 16, wherein the first removable blade performs the function of a hub, a repeater, a switch, a power over Ethernet injector, or a gateway to the Internet of Things.

18. The method of claim 16, wherein the non-Ethernet input comprises: a fiber optic input, a non-Ethernet audio input, a non-Ethernet video input, a wireless input or a digital electricity input.

19. The method of claim 16, wherein the housing comprises a ceiling-mounted housing, a wall-mounted housing, or a floor-mounted housing.

20. The method of claim 16, wherein at least one of the first and second removable blades includes a controller to control a device coupled to the blade.

* * * * *